US 8,825,984 B1

(12) United States Patent
Srinivasan et al.

(10) Patent No.: US 8,825,984 B1
(45) Date of Patent: Sep. 2, 2014

(54) ADDRESS TRANSLATION MECHANISM FOR SHARED MEMORY BASED INTER-DOMAIN COMMUNICATION

(75) Inventors: Kiran Srinivasan, Cupertino, CA (US); Prashanth Radhakrishnan, Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 1258 days.

(21) Appl. No.: 12/250,153

(22) Filed: Oct. 13, 2008

(51) Int. Cl.
*G06F 12/00* (2006.01)
*G06F 12/10* (2006.01)

(52) U.S. Cl.
CPC ........ *G06F 12/1027* (2013.01); *G06F 12/1009* (2013.01)
USPC .......................................................... 711/206

(58) Field of Classification Search
USPC .......................................................... 711/206
See application file for complete search history.

(56) References Cited

U.S. PATENT DOCUMENTS 7,136,385 B2 * 11/2006 Damon et al. ........... 370/395.31
2005/0273571 A1 * 12/2005 Lyon et al. ................... 711/203

OTHER PUBLICATIONS

Leslie, et al, "Encapsulated user-level device drivers in the Mungi operating system." (Sch. of Comp. Science & Engr. & Nat'l ICT Australia, Univ. NSW) WS Obj. Syst. & Softw. Arch. 2004. cs.adelaide.edu.au.
Chase, et al. "Sharing and protection in a single address space operating system" Dept. Comp. Science & Engr., Univ. Wash., Seattle, WA. TCM Transactions on Computer Systems (May 1994).

* cited by examiner

*Primary Examiner* — Matthew Bradley
*Assistant Examiner* — Craig Goldschmidt
(74) *Attorney, Agent, or Firm* — Perkins Coie LLP

(57) ABSTRACT

A technique for "zero copy" transitive communication of data between virtual address domains maintains a translation table hierarchy for each domain. The hierarchy of each domain includes a portion corresponding to every other domain in the system, where the portion for any particular domain begins at the same offset in the virtual address space of every domain. For each domain, there is a source hierarchy used only by the domain itself, which provides read/write access to the addresses in that domain; and a target hierarchy which provides read-only access to that domain, for use only when another domain is the target of IDC from that domain. Only one instance of the target hierarchy of each domain is provided, for all other domains as targets of IDC from that domain. For further space savings the source and target translation table hierarchies can be combined at all but the top hierarchy level.

15 Claims, 9 Drawing Sheets

ADDRESS TRANSLATION MECHANISM FOR SHARED MEMORY BASED INTER-DOMAIN COMMUNICATION

FIELD OF THE INVENTION

At least one embodiment of the present invention pertains to communication between virtual address domains in a processing system, and more particularly, to an efficient address translation mechanism for use in shared memory based inter-domain communication.

BACKGROUND

A conventional computer system or other form of processing system can include multiple virtual address domains. A "domain" is defined herein as a protected address space. By "protected", what is meant is that unauthorized writes to the address space by any source other than the entity that owns the address space are not allowed. Every domain is owned by a separate processing entity of some form. Such a processing entity can be, for example, a virtual machine (VM) in a virtualization environment, or a process or thread in a traditional operating system context.

Efficient communication between domains, or inter-domain communication (IDC), is an important feature in a processing system in which domains cooperate to create a cohesive, high throughput, I/O sensitive server application. An example of such an application is a network storage server. The partitioning of the system's functionality into domains might be done for the purpose of fault isolation between components, for example. In this scenario, by design, it is likely that the domains communicate extensively with each other. Shortcomings in IDC performance would therefore tend to result in poor performance of the overall system.

Current IDC implementations are usually based on some form of shared-memory scheme. Shared memory mechanisms are an advantageous way to implement IDC, since they need not involve creating extra copies of the data being communicated and can be implemented with low overhead in the critical path of data motion. The protocol used to implement the communication usually involves exchange of messages containing pointers to the shared region of memory coupled with a signaling mechanism. Since the messages can contain pointers to the shared data, the bulk of the data transfer can be implemented in a zero-copy fashion; thereby improving performance. The actual exchange of messages can be implemented using some form asynchronous communication utilizing shared producer-consumer queues between the domains.

Shared memory mechanisms entail importing and exporting of address spaces between different domains. Each domain typically has a virtual-to-physical address translation table hierarchy (or simply "translation table" herein), which the domain uses to translate between virtual addresses and physical addresses. The number of levels in the translation table is an architecture-specific value that depends on the addressable range (e.g., 32-bit or 64-bit). Importing an address space generally implies that the translation table at the target domain needs to be populated with the translation table entries from the source domain at an appropriate offset in its virtual address space, in addition to the translation entries for its own memory.

If the imported data is mapped to a different memory region in the target domain relative to the source domain, then there are ramifications for the protocol/messages sent as part of IDC. The messages that constitute IDC will contain either relative pointers (to the base of the shared region), or they will contain absolute pointers that need to be translated in the appropriate target context.

To be effective, memory sharing based IDC assumes the use of a low-overhead address translation mechanism between the domains. Yet the above two approaches (i.e., relative pointers and absolute pointers) have shortcomings. For example, in the relative pointer approach the pointers obtained by the target domain from a source domain can be passed transparently to a third domain, but it involves the additional cost of pointer "swizzling" before data access, making the approach inefficient. This ability, i.e., transitivity across multiple domains, is critical in certain network storage systems. On the other hand, absolute pointers require translation to the target context before dereferencing (accessing the data), because the mapped memory regions are different from one domain to another. This translation is commonly referred to as pointer "swizzling" and adds overhead in the critical path of data motion.

Hence, it is believed that the prior art does not provide an efficient way to perform zero-copy transitive communication of data between multiple domains in a processing system.

SUMMARY

The technique introduced here provides efficient "zero copy" transitive communication of data between multiple virtual address domains, with efficient use of memory for translation tables.

A first aspect of the technique is to maintain a translation table hierarchy for each of the domains, where the translation table hierarchy of each domain includes a portion corresponding to every other domain in the system, and where the portion corresponding to any particular domain begins at the same offset in the virtual address space of every domain. This aspect achieves the effect and benefits (e.g., the simplicity) of a single global address space for all domains, but without many of the complexities and difficulties associated therewith.

A second aspect of the technique is to reduce the consumption of memory by translation tables, by implementing the following two address translation table hierarchies for each domain: one translation table hierarchy (the "source hierarchy") is used only by the domain itself and provides read/write access to the addresses in that domain; the second translation table hierarchy (the "target hierarchy") provides read-only access to that domain and is for use only when another domain is the target of IDC from that domain. Only a single instance is provided of the target hierarchy of each domain, for all of the other domains as targets of IDC from that domain. This aspect further reduces duplication of page table entries across domains, thereby further reducing memory consumption by translation tables.

A third aspect is that, to reduce even further the amount of memory consumed by the hierarchies, an upper level directory in the target hierarchy can be made to point to a large portion of the source hierarchy, so in effect, the target hierarchy incorporates most of the source hierarchy.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
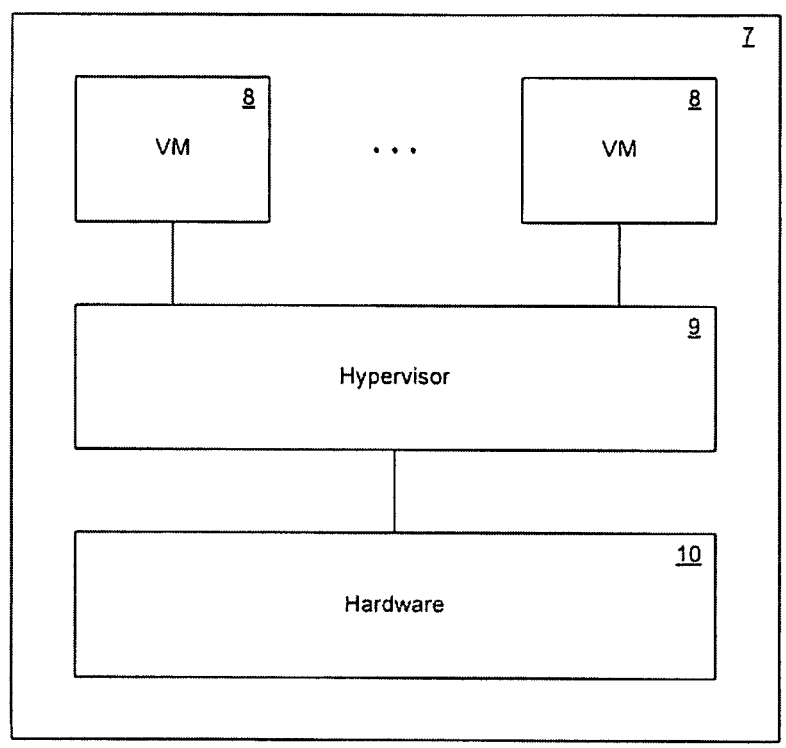
FIG. 1 illustrates a processing system which includes a virtualized environment.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

As noted above, current IDC implementations are usually based on some form of shared-memory scheme. To be most effective, memory sharing based IDC needs a low-overhead address translation mechanism between the domains. The advent of 64-bit addressable systems can facilitate such a mechanism.

With a global virtual address space, sharing of memory is simpler to implement. The term "global" in this context means shared by all of the domains in a given system. Each domain can have a separate region of a 64-bit global virtual address space. In this context, any pointer presented by a domain as part of an IDC message is unique across the system and, hence, can be translated by any domain. Note that the terms "pointer" and "address" are used interchangeably herein. In addition, a global virtual address space makes it relatively easy for a domain to share this address with other domains transitively (i.e., where a given virtual address corresponds to the same data in domain A, domain B, domain C, etc.).

A global virtual address space also has other advantages besides efficient zero-copy transfer. For example, it facilitates flexible sharing of data and code (no pointer swizzling is needed). Further, persistent storage can be integrated into the global virtual address space, i.e., providing a uniform namespace/addressing scheme for accessing shared global resources.

A global virtual address space is perhaps best implemented if all of the participating domains share a single global translation table for translating virtual addresses to physical addresses. However, existing systems are not amenable to having a single global translation table for at least two reasons.

First, in most systems the virtual address space for the domains starts from zero. To implement a truly global virtual address space, the virtual address spaces need to start from a fixed location unique to that domain. Yet implementing this change in existing systems would require extensive modifications, especially in the embodiment of virtual machines as domains, and would be rather restrictive.

Second, many implementations simply do not support such a mechanism; their domains have separate translation tables. The virtual address ranges are the same for all of the domains (from 0 to N), but the translation tables used to convert them to physical addresses are different. It is possible to implement a global virtual address space among the domains if all of the tables in the domains actually contain the same content. But in that scenario, memory overhead caused by maintaining multiple copies of the tables becomes a problem.

Nonetheless, the technique introduced here enables the effect and benefits of a single global virtual address space to be achieved, by implementing a pseudo-global address space. What "pseudo-global" means in this context is that the virtual address spaces of the domains in a system can start from zero; however, wherever a domain's memory is mapped into another domain (a target domain), it begins at the same offset in the virtual address space, and that offset is known to all domains in the system. Hence, all of the target domains of an IDC view the same source domain at the same location in their respective virtual address spaces.

Consequently, the source domain of an IDC message needs to do some amount of "pointer swizzling" (modification) before it places a pointer in an IDC message. However, a target domain can now transparently move this pointer to other target domains without any pointer swizzling, since all of the domains can translate the virtual address. This change is less intrusive than implementing a single translation table and can be implemented in existing systems.

Using the same offset across all domains, for each particular domain, does not solve the problem of excessive memory consumption that would result from having multiple copies of the translation tables. However, the technique introduced here does provide a solution to that problem as well. The technique is based on discovering the commonalities across the translation table entries and effectively avoiding duplication of those entries.

In particular, the technique in essence creates two address translation table hierarchies (or simply "translation tables") for each domain: One hierarchy (the "source hierarchy") is used only by the domain itself and provides read/write access to the memory space in that domain; the other hierarchy (the "target hierarchy") provides read-only access to the memory space in that domain and is for use only when another domain is the target of a communication from that domain.

However, instead of creating a separate copy of the target hierarchy for every potential target domain, there is only one instance of the target hierarchy. Furthermore, most of the target hierarchy is shared with the source hierarchy. (As mentioned above, the number of levels in a translation table hierarchy depends on the addressable range; in a 64-bit system, it typically has four levels.) As described further below, an upper level directory in the target hierarchy actually points to the source hierarchy, such that the target hierarchy effectively incorporates most of the source hierarchy. This approach avoids a substantial amount of duplication, thereby avoiding excessive memory consumption, as described further below.

The technique introduced here achieves (in effect) an efficient global virtual address space between domains, without requiring any modifications to the virtual address space management subsystem in domains.

FIG. 1 illustrates a processing system in which the technique introduced here can be implemented. In one embodiment, the processing system 7 is an embedded system implementing a virtualization environment. Accordingly, the processing system 7 includes a number of virtual machines 8, all of which share the same underlying hardware 10 through a hypervisor 9 (which can be called a virtual machine manager).

In the illustrated embodiment, each of the virtual machines 8 corresponds to a separate virtual address domain. In other embodiments, each virtual address domain may be associated with an individual process, thread or other type of processing entity.

Figure 2:
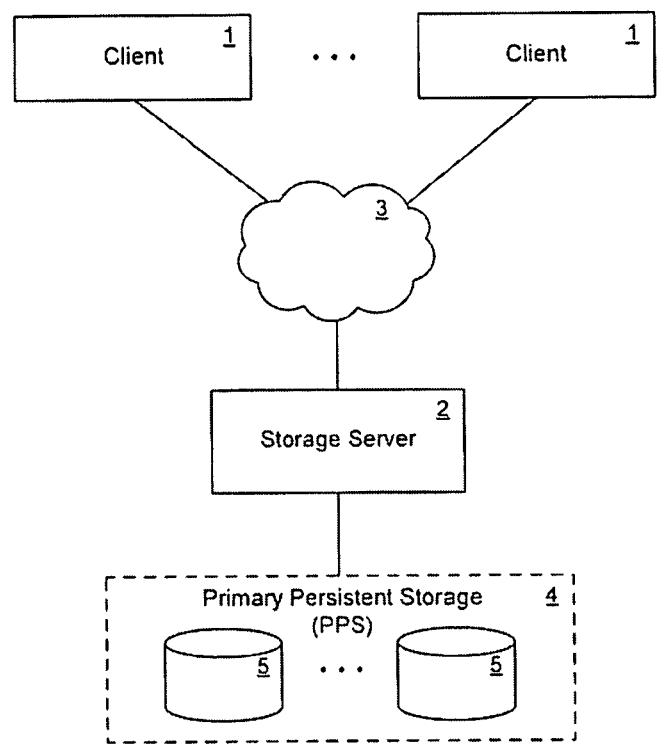
FIG. 2 shows a network configuration that includes a network storage server and clients.

In one embodiment, the processing system 7 is a network storage server, such as shown in FIG. 2. Note, however, that the technique introduced here is not necessarily limited to storage servers or network storage systems. In FIG. 2, a storage server 2 is coupled to a primary persistent storage (PPS) subsystem 4 and is also coupled to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the PPS subsystem 4 is managed by the storage server 2. The storage server 2 receives and responds to various read and write requests from the clients 1, directed to data stored in or to be stored in the storage subsystem 4. The PPS subsystem 4 includes a number of nonvolatile mass storage devices 5, which can be, for example, conventional magnetic or optical disks or tape drives; alternatively, they can be non-volatile solid-state memory, such as flash memory, or any combination of such devices. The mass storage devices 5 in PPS subsystem 4 can be organized as a Redundant Array of Inexpensive Disks (RAID), in which case the storage server 2 accesses the storage subsystem 4 using a RAID algorithm for redundancy.

The storage server 2 may provide file-level data access services to clients 1, such as commonly done in a NAS environment, or block-level data access services such as commonly done in a SAN environment, or it may be capable of providing both file-level and block-level data access services to clients 1. Further, although the storage server 2 is illustrated as a single unit in FIG. 1, it can have a distributed architecture. For example, the storage server 2 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect.

The storage server 2 includes a storage operating system to control its basic operations (e.g., reading and writing data in response to client requests). In certain embodiments, the storage operating system is implemented in the form of software and/or firmware stored in one or more storage devices in the storage server 1.

Figure 3:
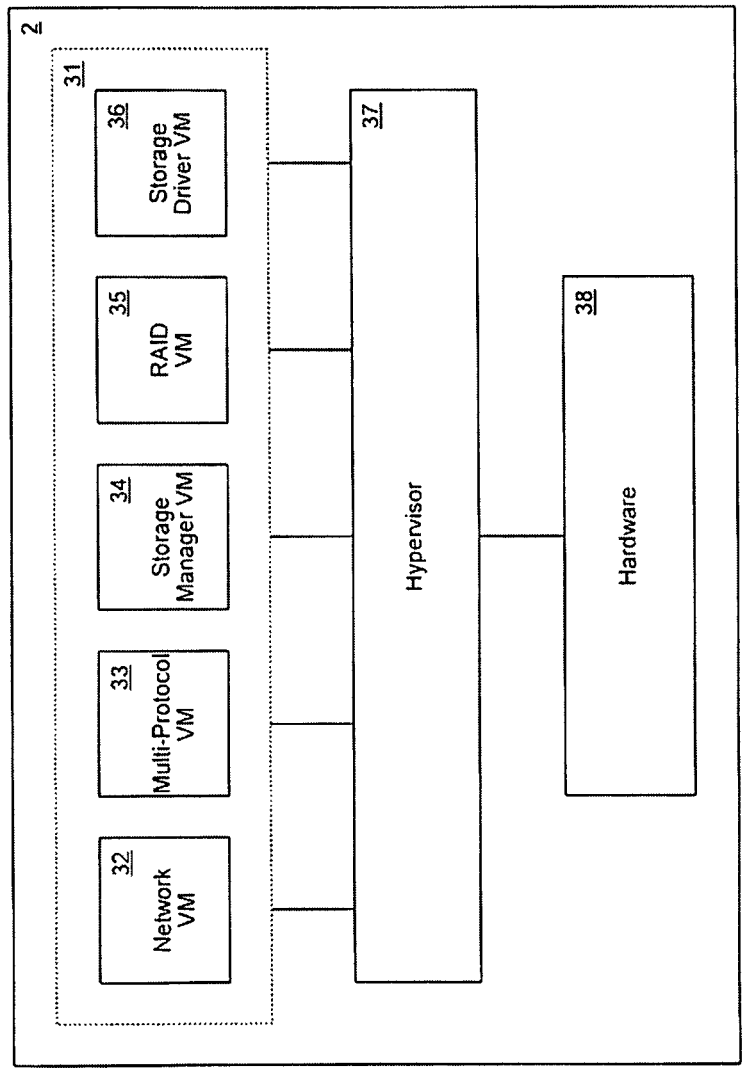
FIG. 3 shows a storage server in which virtual machines implement different components of a storage operating system.

FIG. 3 illustrates an example of how the storage operating system can be implemented. Specifically, the storage operating system 31 can be implemented as a set of virtual machines, which communicate by use of primitives provided by a hypervisor. The virtual machines include a Network virtual machine 32, a Multi-Protocol virtual machine 33, a Storage Manager virtual machine 34, a RAID virtual machine 35 and a Storage Driver virtual machine 36. These virtual machines share the same hardware 38 of the storage server 2 through hypervisor 37. In general, the path of data motion through the storage server 2, from a storage client 1 to the PPS subsystem 4, is through the various virtual machines from left to right in FIG. 3.

The Storage Manager virtual machine 34 is the core functional element of the storage operating system 31. It imposes a structure (e.g., a file system) on the data stored in the PPS subsystem 4 and services read and write requests from clients 1.

The Network virtual machine 32 includes one or more network drivers that implement one or more lower-level protocols to enable the processing system to communicate over the network 3, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The Multi-Protocol virtual machine 33 implements various higher-level network protocols, such as Network File System (NFS), Common Internet File System (CIFS), Hypertext Transfer Protocol (HTTP), Internet small computer system interface (iSCSI), and/or backup/mirroring protocols.

The RAID virtual machine 35 implements a higher-level disk redundancy protocol, such as RAID-4, RAID-5 or RAID-DP. The Storage Driver virtual machine 36 enables the processing system to communicate with the mass storage devices 5 and implements a lower-level storage device access protocol, such as Fibre Channel Protocol (FCP) or small computer system interface (SCSI).

Figure 4:
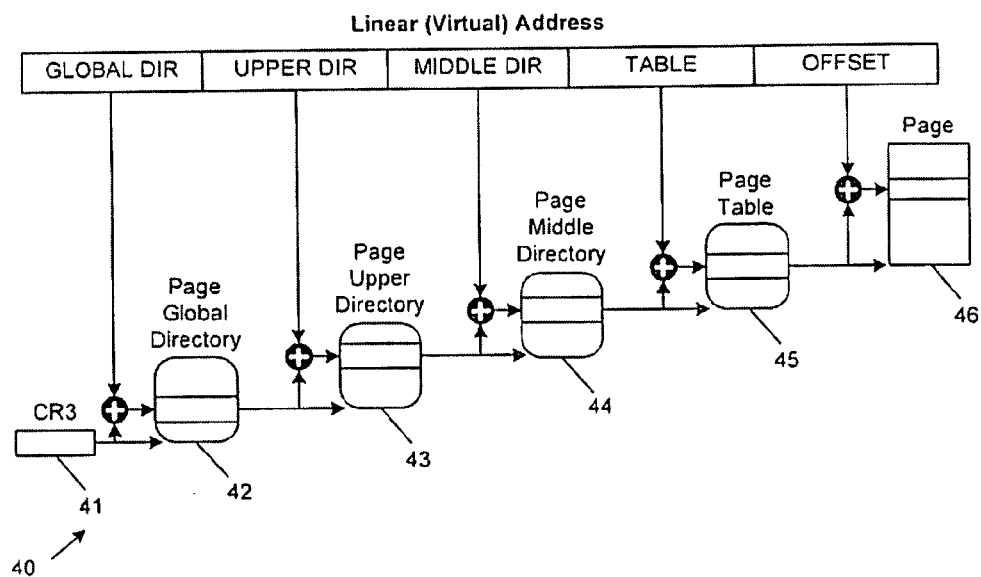
FIG. 4 shows part of an address translation hierarchy for a 64-bit addressable address space.

Translating a virtual address to a physical address entails looking-up through multiple levels in a translation table hierarchy. The number of levels is architecture-specific, depending on the addressable range (e.g., 32-bit or 64-bit). Referring to FIG. 4, in the specific case of 64-bit x86 processors, there are generally four levels of translation tables: the Page Global Directory 42, the Page Upper Directory 43, the Page Middle Directory 44 and the Page table 45. A given linear (virtual address) provides an index into each of these, as shown, and provides an offset into a particular memory page 46.

The intermediate tables 42-45 reside in memory and contribute to memory consumption. The Page Global Directory 42 is pointed to by the processor's CR3 register 41. The contents of the CR3 register represent a physical address that points to the beginning of the Page Global Directory of a processing entity. The processing entity of each domain that owns the memory corresponding to this address space (e.g., a virtual machine, process or thread) sets this register to the appropriate value before performing any translations in its protected address space. Each entry in the Page Global Directory 42 points to a different Page Upper Directory 43. Each entry in a Page Upper Directory 43 points to a different Page Middle Directory 44. Each entry in a Page Middle Directory 44 points to a different Page Table 45. Each entry in a Page Table points to a different memory page 46.

Figure 5:
FIG. 5 shows an example of the format of an entry in a Page Global Directory, Page Upper Directory, Page Middle Directory or Page Table.

FIG. 5 shows an example of the relevant fields in an entry in any Page Global Directory, Page Upper Directory, Page Middle Directory or Page Table. The entry includes a RW/RO flag 54 and a physical address pointer 55 to the next lower level in the hierarchy. The RW/RO flag 54 can be a simple binary value and indicates whether the accessing entity has read-write (RW) permission or read-only (RO) permission for the corresponding memory region.

The (partial) address translation table hierarchy 40 shown in FIG. 4 is hierarchical and can lead to a large profusion of tables at the lower levels. Among other things, each entry at every level contains the permission bits (RW/RO flag 54) that control the level of access (read-only or read-write) to the appropriate memory region. The technique introduced here addresses this concern, as described further below.

As noted above, it is desired to efficiently implement IDC using some sort of a shared memory mechanism, as noted above. This would normally entail that the appropriate translation table entries need to be copied from the source to the target for the shared memory region. It is assumed that the domains that engage in IDC are trusted domains and, hence, are amenable to mapping the entire remote memory region. However, when a memory region is shared, to maintain the notion of "protected" address space it is shared read-only with the target domain. Consequently, the target domain can read the memory region but cannot corrupt it inadvertently.

In a scenario such as this, sharing of the entire address space is possible. However, that would be expensive from a memory consumption perspective. It is assumed that the addresses used in the IDC messages can be translated by the target domain, regardless of whether that is done through partial mapping of the address spaces or through complete mapping. Partial mapping here refers to a domain mapping in only a portion of the address space corresponding to another domain. Typically, this "partial" address space would be sufficient to translate all of the addresses passed via IDC. In the case of partial mapping, it is assumed that the addresses form a contiguous region of memory.

To implement the technique introduced here, it is further assumed that at the time of initial setup of IDC, some form of rendezvous/discovery mechanism is invoked before the domains can start communicating. During that phase, the translation tables are mapped into the various domains (otherwise, the loading of the tables will be in the critical path of data motion activity and will cause higher latencies). Doing the address mapping before the start of IDC ensures that it is not necessary to make fresh mappings into a domain's address space during message passing/interpretation (which would add latency and therefore reduce the efficacy of the IDC).

Consider now the property of transitivity. For effective IDC from one domain to another, e.g. from a domain A to a domain B, it is not sufficient that domain A's memory is mapped read-only onto B. The reason it is not sufficient is that domain A could potentially be communicating with another domain C, and the addresses from domain C might be passed as pointers in the messages to domain B. To handle this case, at initial setup phase of the IDC, domain A exports the memory regions of all domains that are relevant to its communication with domain B and so on. In other words, when a domain initiates IDC with another domain, it has to be able to export not just its memory region but all of the memory regions of the domains from which it might pass addresses. Since the virtual addresses are globally unique, domain C's memory can be mapped into domain B. However, this transitive mapping of translation tables leads to excessive memory consumption, which should be avoided.

Toward solving this problem, at least two insights are associated with the technique introduced here. A domain's memory is imported at a unique offset in any domain's virtual address space. This offset is dependent only on a globally unique characteristic of the exporting domain. For example, in a virtual machine embodiment, the offset can be based on the virtual machine identifier (ID) of the domain. In another example, in the process abstraction, the offset could be based on the process ID of the process.

The first insight is that the translation tables (e.g., Page Global directory, Page Upper Directory, Page Middle Directory and Page Tables) are not different across all potential target domains that have mapped the appropriate memory region read-only. Consequently, it is only necessary to have one copy of each translation table hierarchy 40 (see FIG. 4) for all of the potential target domains that may need to share it; it is not necessary to provide a separate copy for each potential target domain. Using only one copy leads to a substantial decrease in the amount of space required for the translation tables, especially in the case of transitive sharing of memory regions.

The second insight is that, even though the translation tables of the source domain and the target domain of a shared memory region might differ in the entries at any level of the translation hierarchy at or below the Page Global Directory (assuming a 64-bit global address space), if the entire address space is mapped from a source domain to a target domain, then only the Page Global Directory entries need to change, since that is the highest level possible at which access permission bits can be set. In other words, in order to meet the target domain hierarchy's requirement that the address spaces are read-only, the read-only permissions can be set at the highest level (Page Global Directory), and the permission bits in the rest of the hierarchy are irrelevant. The Page Global Directory entries of the source domain can have their permission bits (RW/RO flags) set to Read-Write, since the source can both read as well as write to the shared region that it exports; whereas the Page Global Directory entries of the target would have their permission bits set to Read-Only. When partial but contiguous address spaces are mapped, the permission bits only need to be changed at the highest level of the translation hierarchy that is mapped from one domain into another.

Hence, the second insight includes recognition that there is significant duplication in the intermediate translation tables between the target and source hierarchies. They differ only in the top-level Page Global Directory. Therefore, only the Page Global Directory needs to be copied and its RW/RO flags changed. However, the remaining translation tables are exactly the same. The amount of space consumed by the Page Global Directory is miniscule compared to the other lower-level translation tables in the hierarchy. This technique also leads to a significant decrease in the amount of memory required to implement a global virtual address space.

Overall, using these two techniques (i.e., using a single instance of the translation table hierarchy of a source domain for all target domains, and sharing significant portions of the source and target translation table hierarchies for each domain) ensures that the extra memory used to implement a pseudo-global virtual address space is significantly reduced. This enables an IDC mechanism based on a shared memory designed using a pseudo-global virtual address space to be feasible and practical.

Figure 6:
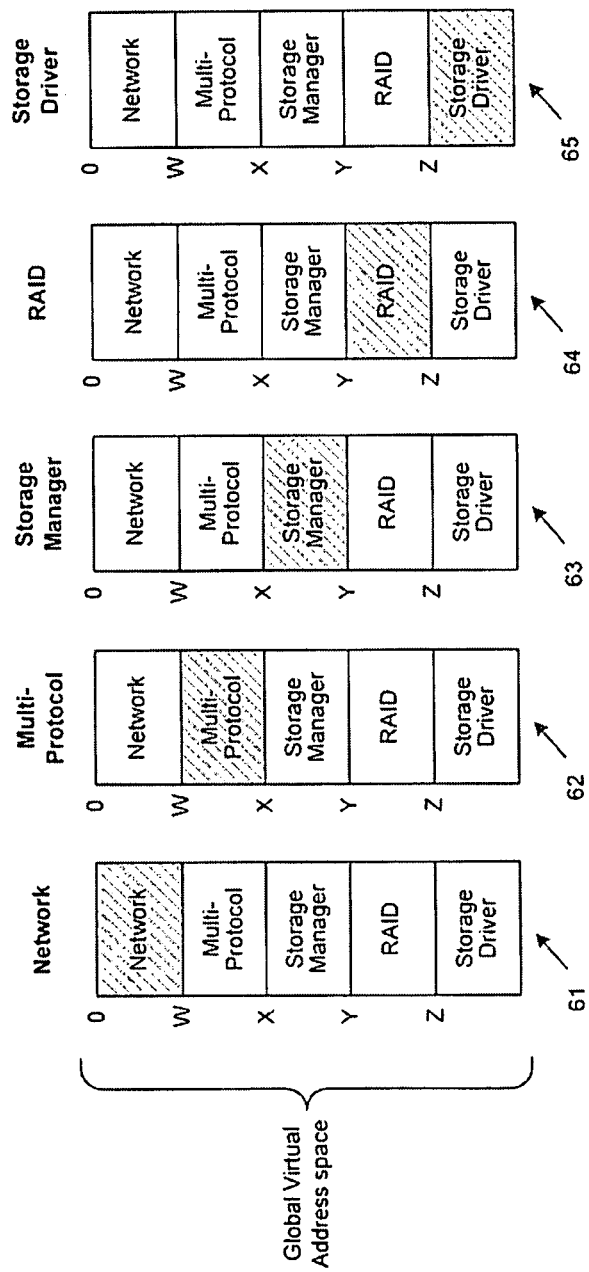
FIG. 6 illustrates an example of the virtual memory space mapping across domains.

FIG. 6 illustrates an example of the virtual memory space mapping across domains, and in particular, an example how the translation tables that correspond to any particular domain begin at the same offset in the virtual address space of every domain, for the storage server example discussed above. Each of the virtual machines (i.e., Network, Multi-Protocol, Storage Manager, RAID and Storage Access) has its own domain. In FIG. 6, each vertical column 61-65 represents a domain (virtual address space), and each rectangle within each column represents the address translation table for a particular domain. Thus, each domain has mapped into its address space the address translation table hierarchy of every domain. As shown, for example, the Network address translation table hierarchy begins at offset 0 in every domain; the Multi-Protocol address translation table hierarchy begins at offset W in every domain; the Storage Manager address translation table hierarchy begins at offset X in every domain; the RAID address translation table hierarchy begins at offset Y in every domain; and the Storage Driver address translation table hierarchy begins at offset Z in every domain. All of these offset values (0, W, X, Y, Z) are known to each domain. This achieves the effect and benefits (e.g., the simplicity) of a single global address space for all domains, but without many of the complexities and difficulties associated therewith.

In FIG. 6, each shaded rectangle represents an address translation table hierarchy for a read-write address space, and each unshaded rectangle represents an address translation table hierarchy for a read-only address space. It can be seen, therefore, that each domain has a read-write address translation table hierarchy for itself, and a read-only address translation table hierarchy for every other domain.

Figure 7:
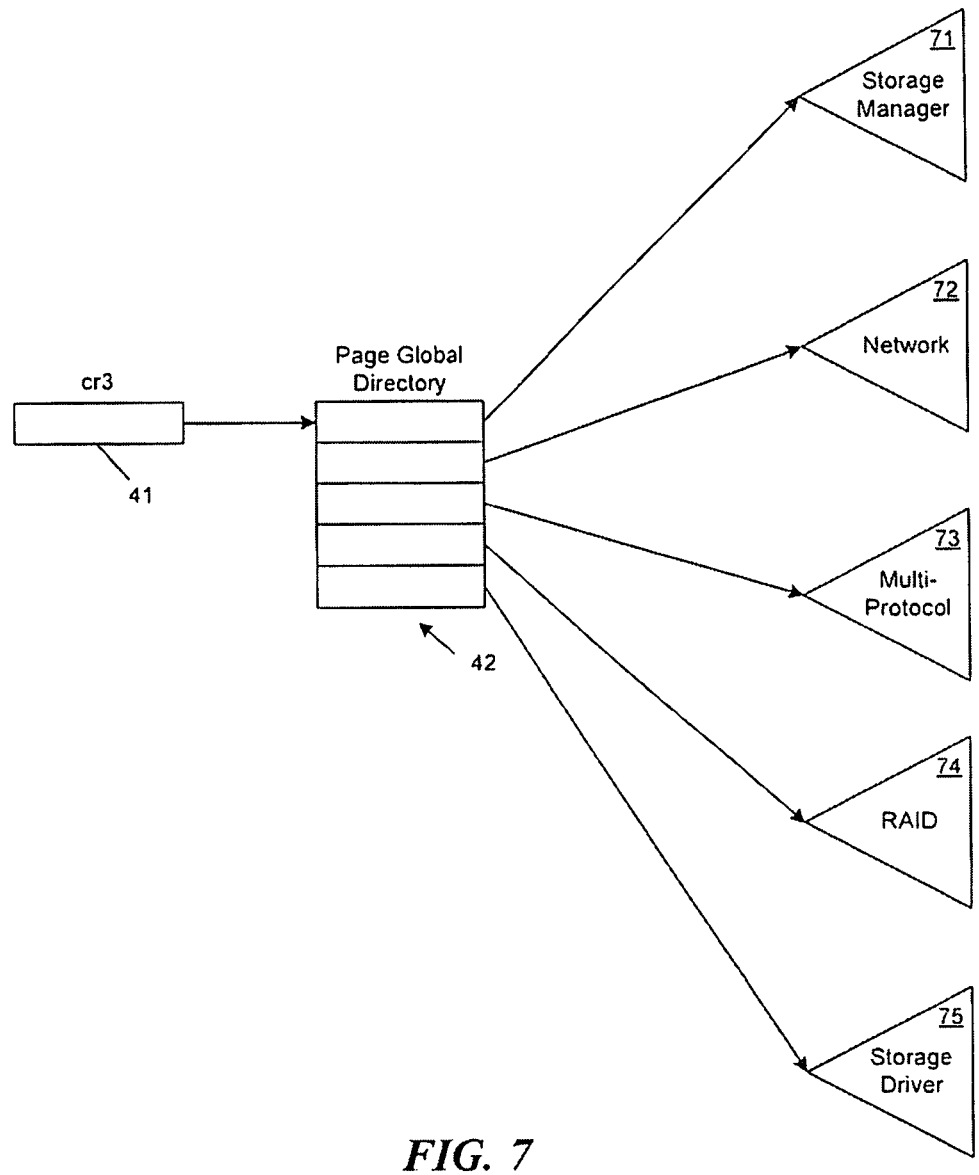
FIG. 7 shows how the address translation table hierarchies of all domains can be mapped into the address space of each domain.

FIG. 7 illustrates one way of implementing the translation table mapping scheme of FIG. 6, for any particular domain. As shown, the CR3 register 41 points to the Page Global Directory 42, and different entries in the Page Global Directory 42 point to the address translation table hierarchies 71-75 of the various domains.

One problem with the approach of FIGS. 6 and 7 is that it results in unnecessary duplication of table entries across domains. As noted above, it is not necessary to provide a copy of the translation table hierarchy of every domain in the address space of every other domain which is a potential target of that domain. Instead, for each particular domain, only the Page Global Directory needs to be copied and its permission bits changed. So for each domain, the technique introduced here implements exactly two address translation table hierarchies, as shown in FIG. 8: one translation table hierarchy ("source hierarchy") 81 is used only by the domain itself and provides read/write access to the memory space in that domain; the second translation table hierarchy ("target hierarchy") 82 provides read-only access to the memory space in that domain and is for use only when another domain is the target of IDC from that domain.

Figure 8:
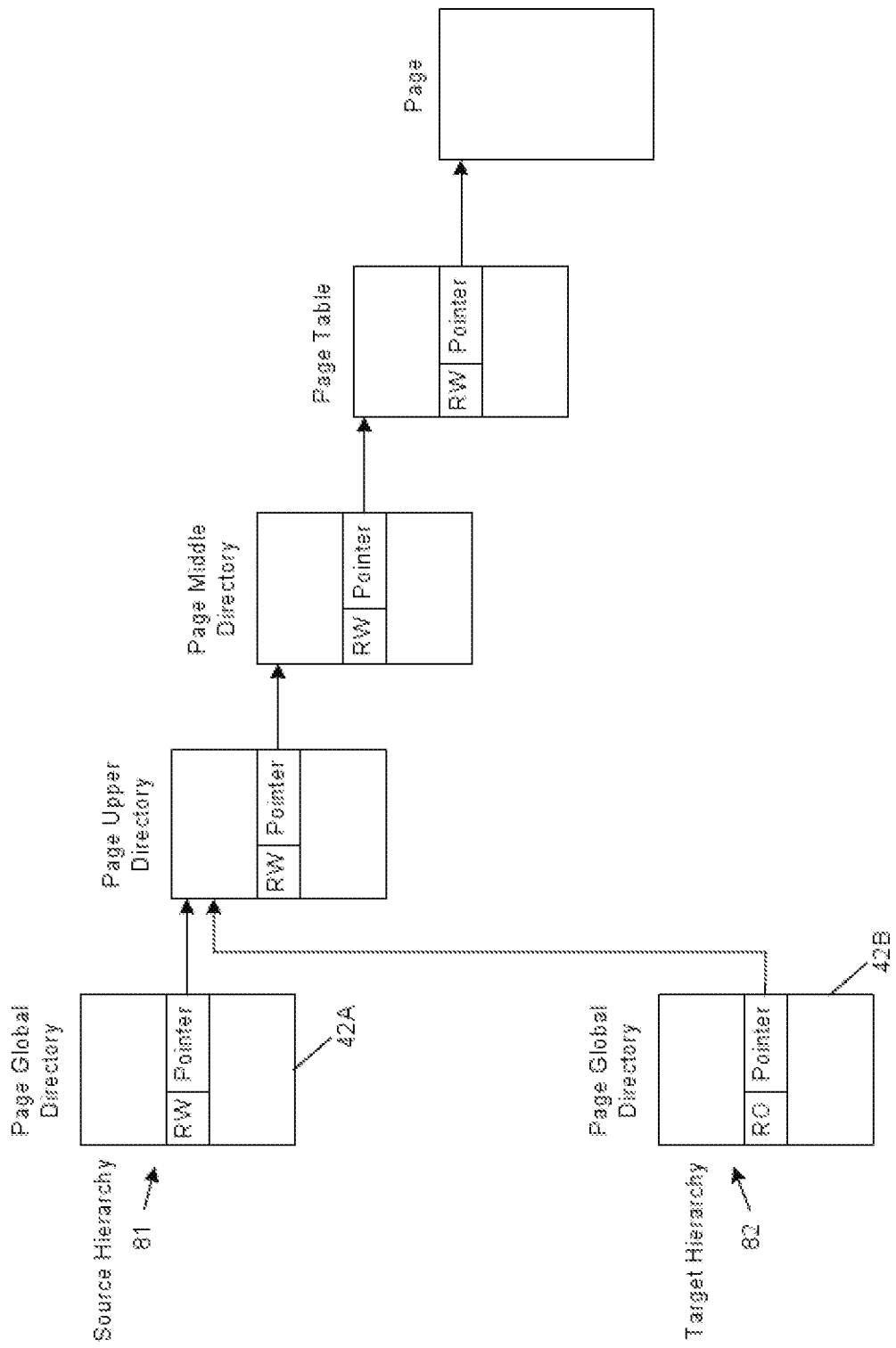
FIG. 8 illustrates a source address translation table hierarchy and a target translation table hierarchy for a given domain.

To reduce the amount of memory consumed by the translation table hierarchies, the Page Global Directory in the target hierarchy 82 points to the Pager Upper Directory level in the source hierarchy 81; so in effect, the target hierarchy 82 incorporates (i.e., is mostly populated with) parts of the source hierarchy, as shown in FIG. 8. The amount of space consumed by the Page Global Directories 42A and 42B is miniscule compared to all of the lower levels in the hierarchy. This technique therefore avoids a significant amount of duplication of hierarchy entries.

The target Page Global Directory 42B in the target hierarchy 82 has its RW/RO flags set to Read-Only (RO), whereas the target Page Global Directory 42A in the source hierarchy 81 has its RW/RO flags set to Read-Write (RW). As a result, anytime memory is accessed through the target hierarchy's Page Global Directory 42B, it does not matter how the RW/RO flags are set in the lower levels of the hierarchy; access privileges are governed by the permission bits in the highest level that is mapped (the Page Global Directory), and therefore, access will always be read-only when access is through the target hierarchy 82.

In addition, only a single instance of the target address translation table hierarchy 82 of each domain is provided or needed, for all of the other domains that are potential targets of communication from that domain (as opposed to providing a separate copy of the target hierarchy for each potential target domain). This aspect further reduces duplication of page table entries across domains, thereby further reducing memory consumption by translation tables.

Figure 9:
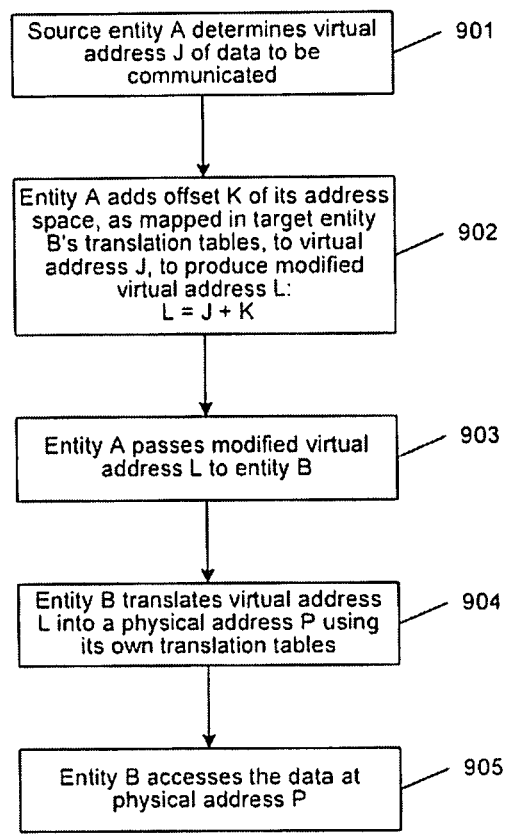
FIG. 9 is a flow diagram showing an example of a process by which processing entities can communicate with each other across domains.

FIG. 9 shows an example of the process by which virtual machines (or other types of processing entities) can communicate with each other across domains, using the techniques described above. Assume that a first processing entity, entity A, wishes to communicate data with a second processing entity, entity B, in another domain. Accordingly, at 901 entity A determines the virtual address J, in its own address space, of the data to be communicated. Next, at 902 entity A adds the offset K of its address space, as mapped in entity B's translation tables, to virtual address J, to produce modified virtual address L: L=J+K. Entity A then passes the modified virtual address L to entity B at 903. At 904 entity B translates the modified virtual address L into a physical address P using its own translation tables in its own address space. Finally, at 905 entity B accesses the data at physical address P. Thus, the data has been effectively communicated between the processing entities across domains, by using memory sharing (zero copy).

Note that only one swizzling operation needs to be done to communicate data at a given source address, which is done by the source entity (e.g., entity A in the example above, at step 902). This shows the transitive property of this IDC technique: If entity B wants to send the same data it received form entity A to another entity, entity C, which is associated with another domain, then entity B only needs to pass the virtual address L that it received from entity A to entity C. This is because entity A's address space is mapped into entity C's translation table hierarchy at exactly the same offset as in entity B's and every other domain's translation table hierarchy.

Figure 10:
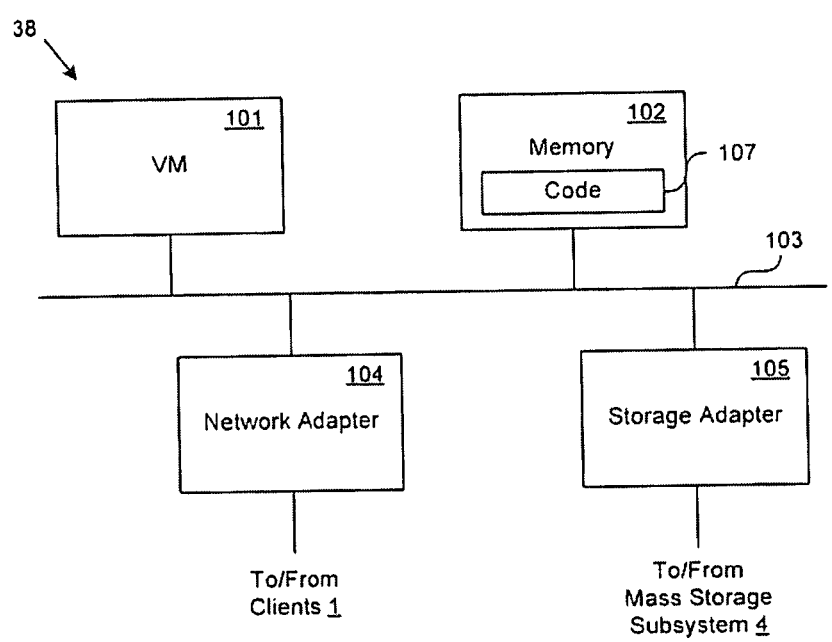
FIG. 10 is a high-level block diagram showing an example of the architecture of a storage server.

FIG. 10 is a high-level block diagram showing an example of the architecture of the hardware 38 (FIG. 3) of the storage server 2. In the illustrated embodiment, the hardware 38 of the storage server 2 includes one or more processors 101 and memory 102 coupled to an interconnect 103. The interconnect 103 shown in FIG. 10 is an abstraction that represents any one or more separate physical buses, point-to-point connections, or both, connected by appropriate bridges, adapters, or controllers. The interconnect 103, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 101 is/are the central processing unit (CPU) of the storage server 2 and, thus, control the overall operation of the storage server 2. In certain embodiments, the processor(s) 101 accomplish this by executing software or firmware stored in memory 102. The processor(s) 101 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 102 is or includes the main memory of the storage server 2. The memory 102 represents any form of random access memory (RAM), read-only memory (ROM), flash memory, or the like, or a combination of such devices. In use, the memory 102 may contain, among other things, code 107 embodying the storage operating system 31.

Also connected to the processor(s) 101 through the interconnect 103 are a network adapter 104 and a storage adapter 105. The network adapter 104 provides the storage server 2 with the ability to communicate with remote devices, such as hosts 1, over the interconnect 3 and may be, for example, an Ethernet adapter or Fibre Channel adapter. The storage adapter 105 allows the storage server 2 to access the storage subsystem 4 and may be, for example, a Fibre Channel adapter or SCSI adapter.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, comprising:
    creating a first address translation table hierarchy for a first virtual address domain of a plurality of virtual address domains of a processing system;
    creating a second address translation table hierarchy for the first virtual address domain, for use when a second virtual address domain is a target of data communication from the first virtual address domain, the second address translation table hierarchy incorporating part of the first address translation table hierarchy; and
    using the second address translation table hierarchy to communicate data between the first and second virtual address domains,
    wherein the first address translation table hierarchy provides read-write permission to access a corresponding memory space, and the second address translation table hierarchy provides read-only permission to access the corresponding memory space;
    wherein the first address translation hierarchy includes a first to level, and first lower levels include at least a page directory level and a page table level, the page directory level including page directories comprising pointers to page tables of the page table level, the page tables comprising pointers to memory pages; wherein the first top level includes an access permission indicator for the corresponding memory space, the access permission indicator governing access to the corresponding memory space regardless of permission indicators of the first lower levels;
    wherein the second address translation hierarchy includes a second to level that has at least one directory entry pointing to directories of the first lower levels of the first address translation hierarchy, the second address translation hierarchy including levels of the first address translation hierarchy below the first to level; wherein the second to level of the second address translation hierarchy includes an access permission indicator that is set differently from the access permission indicator in the first to level of the first translation hierarchy.

2. A method as recited in claim 1, wherein said creating a first address translation table hierarchy and said creating a second address translation table hierarchy are done for each virtual address domain of the plurality of virtual address domains.

3. A method as recited in claim 1, wherein each of the virtual address domains corresponds to a separate one of a plurality of virtual machines.

4. A method comprising:
    operating a plurality of processing entities in a processing system, each of the processing entities having a separate virtual address domain of a plurality of virtual address domains; and
    maintaining a translation table hierarchy for each of the plurality of virtual address domains, for mapping between virtual addresses and physical addresses, wherein the translation table hierarchy of each domain includes a portion corresponding to every other domain of the plurality of virtual address domains, and wherein the portion corresponding to any given domain begins at the same offset in the virtual address space of each domain of the plurality of virtual address domains;
    wherein the translation table hierarchy for each of the domains includes:
        a source address translation table hierarchy for said domain that provides read-write permission to access a corresponding memory space, for use only by the corresponding processing entity; and
        a separate target address translation table hierarchy for said domain that provides read-only permission to access the corresponding memory space, for use by the processing entity of any other domain which is a target of communication from said processing entity;
    wherein the source address translation hierarchy includes a first to level, and first lower levels include at least a page directory level and a page table level, the page directory level including page directories comprising pointers to page tables of the page table level, the page tables comprising pointers to memory pages; wherein the first top level includes an access permission indicator for the corresponding memory space, the access permission indicator governing access to the corresponding memory space regardless of permission indicators of the first lower levels;
    wherein the target address translation hierarchy includes a second to level that has at least one directory entry pointing to directories of the first lower levels of the source address translation hierarchy, the target address translation hierarchy including levels of the source address translation hierarchy below the first to level; wherein the second to level of the target address translation hierarchy includes an access permission indicator that is set differently from the access permission indicator in the first to level of the source translation hierarchy.

5. A method as recited in claim 4, wherein each of the processing entities is a virtual machine.

6. A method comprising:
    creating a plurality of virtual machines in a processing system, the plurality of virtual machines including a first virtual machine and a second virtual machine;

creating a plurality of address translation table hierarchies for use in performing virtual address to physical address translation during communications between the first and second virtual machines, including
  creating a first address translation table hierarchy and a second address translation table hierarchy for the first virtual machine, for mapping between virtual addresses and physical addresses, wherein a portion of the first address translation table hierarchy is incorporated into the second address translation table hierarchy; and
communicating data from the first virtual machine to the second virtual machine without copying the data, wherein said communicating includes
  determining a first virtual address of the data in a domain of the first virtual machine,
  modifying the first virtual address according to an offset of the second translation table hierarchy in a domain of the second virtual machine, to form a modified virtual address,
  passing the modified virtual address to the second virtual machine, and
  using the second address translation table hierarchy of the first virtual machine to map the modified virtual address to a physical address;
wherein:
  the first address translation table hierarchy of the first virtual machine corresponds to the virtual address space of the first virtual machine with read-write permission; and
  the second address translation table hierarchy of the first virtual machine corresponds to the virtual address space of the first virtual machine with read-only permission;
wherein the first address translation hierarchy includes a first to level, and first lower levels include at least a page directory level and a page table level, the page directory level including page directories comprising pointers to page tables of the page table level, the page tables comprising pointers to memory pages; wherein the first top level includes an access permission indicator for the corresponding address space, the access permission indicator governing access to the corresponding address space regardless of permission indicators of the first lower levels;
wherein the second address translation hierarchy includes a second to level that has at least one directory entry pointing to directories of the first lower levels of the first address translation hierarchy, the second address translation hierarchy including all levels of the first address translation hierarchy below the first to level; wherein the second to level of the second address translation hierarchy includes an access permission indicator that is set differently from the access permission indicator in the first to level of the first translation hierarchy.

7. A method as recited in claim 6, wherein the processing system has a 64-bit address space, and wherein said portion of the first address translation table hierarchy which is incorporated into the second address translation table hierarchy includes all levels of the first address translation table hierarchy below a page global directory level.

8. A method as recited in claim 6, wherein each of the first and second virtual machines each correspond to first and second domains, respectively, of a pseudo-global virtual address space.

9. A processing system comprising:
  a processor;
  a plurality of processing entities, each of the processing entities having a separate one of a plurality of virtual address domains; and
  a storage medium storing code which, when executed by the processor, causes the processing system to perform operations including
    creating a source address translation table hierarchy corresponding to a virtual address space of a first virtual address domain, for use by the first virtual address domain,
    creating a target address translation table hierarchy corresponding to a virtual address space of the first virtual address domain, the target address translation table hierarchy for use by a second virtual address domain when the second virtual address domain is a target of communication from the first virtual address domain, the target address translation table hierarchy incorporating part of the source address translation table hierarchy; and
    using the target address translation table hierarchy to communicate data between the first and second virtual address domains;
  wherein:
    the source address translation table hierarchy of the first virtual address domain provides read-write permission to access a memory space of the first virtual address domain; and
    the target address translation table hierarchy of the first virtual address domain provides read-only permission to access the memory space of the first virtual address domain;
  wherein the source address translation hierarchy includes a first to level, and first lower levels including at least a page directory level and a page table level, the page directory level including page directories comprising pointers to page tables of the page table level, the page tables comprising pointers to memory pages; wherein the first to level includes an access permission indicator for the corresponding memory space, the access permission indicator governing access to the corresponding memory space regardless of permission indicators of the first lower levels;
  wherein the target address translation hierarchy includes a second to level that has at least one directory entry pointing to directories of the first lower levels of the source address translation hierarchy, so that the target address translation hierarchy including all levels of the source address translation hierarchy below the first to level; wherein the second to level of the target address translation hierarchy includes an access permission indicator that is set differently from the access permission indicator in the first to level of the source translation hierarchy.

10. A processing system as recited in claim 9, wherein the storage medium further stores code which, when executed by the processor, causes the processing system to perform operations including
  creating a source address translation table hierarchy corresponding to the virtual address space of the second virtual address domain, for use by the second virtual address domain,
  creating a target address translation table hierarchy corresponding to the virtual address space of the second virtual address domain, the target address translation table hierarchy for use by the first virtual address domain when the first virtual address domain is a target of communication from the second virtual address domain, the target address translation table hierarchy of the second virtual address domain incorporating part of the source address translation table hierarchy of the second virtual address domain.

11. A processing system as recited in claim 9, wherein at least two of the plurality of processing entities are virtual machines.

12. A processing system as recited in claim 9, wherein at least two of the plurality of processing entities are configured collectively to perform network storage services in response to a request of a remote storage client.

13. A network storage server comprising:
   a processor;
   a network interface through which to receive a data access request from a client;
   a storage interface through which to access a mass storage facility in response to the data access request;
   a plurality of processing entities, each having a separate one of a plurality of virtual address domains, collectively to implement network storage functions of the network storage server, each of the virtual address domains corresponding to a separate portion of a pseudo-global virtual address space;
   for each said virtual address domain,
      a source address translation table hierarchy for use by the corresponding processing entity, and
      a target address translation table hierarchy for use by another processing entity which is a communication target, the target address translation table hierarchy incorporating part of the source address translation table hierarchy; and
   code which when executed by the processor causes the target address translation table hierarchy of one of the domains to be used to translate a virtual address for communication of data between domains;
   wherein:
      the source address translation table hierarchy of each domain provides the corresponding processing entity with read-write permission to access a memory space of the domain; and
      the target address translation table hierarchy of each domain provides read-only permission to access the memory space of the domain;
   wherein the source address translation hierarchy includes a first to level, and first lower levels include at least a page directory level and a page table level, the page directory level including page directories comprising pointers to page tables of the page table level, the page tables comprising pointers to memory pages; wherein the top level includes an access permission indicator for the corresponding memory space, the access permission indicator governing access to the corresponding memory space regardless of permission indicators of the first lower levels;
   wherein the target address translation hierarchy includes a second to level that has at least one directory entry pointing to directories of the first lower levels of the source address translation hierarchy, so that the target address translation hierarchy including all levels of the source address translation hierarchy below the first to level; wherein the second to level of the target address translation hierarchy includes an access permission indicator that is set differently from the access permission indicator in the first to level of the source translation hierarchy.

14. A network storage server as recited in claim 13, wherein each of the plurality of processing entities is a virtual machine.

15. A network storage server as recited in claim 14, wherein:
   a first one of the virtual machines implements a file system layer of the network storage server;
   a second one of the virtual machines implements a network access layer of the network storage server; and
   a third one of the virtual machines implements a storage access layer of the network storage server.

* * * * *